(12) United States Patent
Haubs et al.

(10) Patent No.: US 6,201,098 B1
(45) Date of Patent: Mar. 13, 2001

(54) PROCESS FOR PREPARING SULPHUROUS POLYMERS

(75) Inventors: Michael Haubs, Kreuznach; Stephan Wagner, Wiesbaden; Olaf Besser, Frankfurt, all of (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/269,700

(22) PCT Filed: Sep. 24, 1997

(86) PCT No.: PCT/EP97/05229

§ 371 Date: May 24, 1999

§ 102(e) Date: May 24, 1999

(87) PCT Pub. No.: WO98/14503

PCT Pub. Date: Apr. 9, 1998

(30) Foreign Application Priority Data

Oct. 2, 1996 (DE) .............................. 196 40 737

(51) Int. Cl.[7] .............................. C08G 75/14; C08G 8/02
(52) U.S. Cl. .......................... 528/373; 528/125; 528/126; 528/128; 528/220; 528/222; 528/226; 528/387
(58) Field of Search ...................................... 528/373, 384, 528/125, 126, 128, 220, 222, 226

(56) References Cited

U.S. PATENT DOCUMENTS

| 4,734,484 | * | 3/1988 | Alfer et al. | 528/502 |
| 5,177,183 | * | 1/1993 | Hay et al. | 528/388 |
| 5,688,908 | * | 11/1997 | Haubs et al. | 528/388 |

* cited by examiner

*Primary Examiner*—P. Hampton-Hightower
(74) *Attorney, Agent, or Firm*—Connolly Bove Lodge & Hutz LLP

(57) ABSTRACT

The invention concerns a process for preparing linear or branched sulphurous polymers such as polyarylene sulphides, in particular polyphenylene sulphide, from an aromatic dihalide compound and a sulphide in a solvent, wherein a) the aromatic dihalide compound and the sulphide are partially reacted; b) the resultant salt which is not dissolved in the reaction medium is separated off; and c) the reaction mixture largely freed of the salt is further polymerized.

12 Claims, No Drawings

PROCESS FOR PREPARING SULPHUROUS POLYMERS

BACKGROUND OF THE INVENTION

The invention relates to a process for the preparation of linear or branched sulfur-containing polymers such as polyarylene sulfides, in particular polyphenylene sulfide (PPS).

U.S. Pat. No. 4,910,294 describes a process for the preparation of PPS. The monomers used are dihalogenated, aromatic hydrocarbons, in particular dichlorobenzene (DCB), and sodium sulfide, which are reacted in a highboiling, dipolar aprotic solvent such as N-methylpyrrolidone (NMP). The sodium chloride which forms as a byproduct is removed from the polymer after the polymerization reaction has finished either, as described in EP 220 490, by filtering the reaction solution whilst it is still hot at elevated temperature under pressure, or by dissolving in water. According to the prior art, the molar mass of the end product of the polycondensation reaction is attained before the sodium chloride is removed.

A disadvantage of this preparation process is, however, that the space-time yield of the reactors is unsatisfactory because a relatively long reaction time is required.

The object is therefore to overcome this disadvantage.

SUMMARY OF THE INVENTION

Surprisingly, we found that removal of the salt before the polymerization reaction has finished shortens the reaction time overall and leads to higher molar masses. Presumably, the sulfide content in the solid salt residue from the polymerization of a polyarylene sulfide leads to a significant decrease in the molar mass of the highly polymerized arylene sulfide, or hinders a rapid increase in the molar mass.

The invention therefore provides a process for the preparation of sulfur-containing polymers from at least one aromatic dihalo compound and at least one sulfide in a solvent by
a) partially reacting the aromatic dihalo compound and the sulfide,
b) removing the salt formed, which is practically insoluble in the reaction medium, and
c) further polymerizing the reaction mixture, substantially freed from the salt is further polymerized.

It has thus been possible to considerably improve the space-time yield during the preparation of sulfur-containing polymers, in particular polyarylene sulfides from aromatic dihalo compounds and alkali metal sulfides, because the salt which forms as a byproduct is removed before the polycondensation reaction has finished and the reaction mixture, substantially freed from the salt and still not completely polymerized, is more readily susceptible to further polymerization.

DETAILED DESCRIPTION OF THE INVENTION

The process according to the invention makes it possible to obtain sulfur-containing polymers, in particular polyarylene sulfides, over a wide molar mass range (e.g., Mw=10,000–200,000 g/mol) in good space-time yield under very mild reaction conditions and with very little contamination from byproducts.

Sulfur-containing polymers are polymers which contain arylene sulfide units. The arylene moieties of the arylene sulfide units contain monocyclic or polycyclic aromatic compounds or coupled aromatic compounds. The aromatic compounds can also contain hetero atoms. Such aromatic compounds, which can be substituted or unsubstituted, are, for example, benzene, pyridine, biphenyl, naphthalene and phenanthrene. Substituents include C1–C6-alkyl, C1–C6-alkoxy, carboxyl, amino and sulfo groups. Coupled aromatic compounds are, for example, biphenyl or aromatic compounds linked by ether bridges (arylene ethers).

Preferred sulfur-containing polymers are polyarylene sulfides, in particular polyphenylene sulfide.

The aromatic dihalo compounds used for the preparation of the polyarylene compounds are, for example, dihalogenated aromatic hydrocarbons, including dihalobenzenes such as o-, m- and p-dichlorobenzene, substituted dihalobenzenes such as 2,5-dichlorotoluene, 3,5-dichlorobenzoic acid, 2,5-dichlorobenzenesulfonic acid or 3,5-dichlorobenzenesulfonic acid and their salts. Dihalonaphthalenes such as 1,4-dibromonaphthalene or dihalodiphenyl ethers such as 4,4'-dichlorodiphenyl ether can, however, also be used. Mixtures of different arylene dihalides can also be used. Small quantities (0.2 to 5 mol %, based on the dihaloaromatic compound) of polyhalogenated aromatic hydrocarbons can also be used in order to obtain branched or crosslinked sulfur-containing polymers.

Suitable sulfides for the preparation of the polymers are inorganic and organic sulfides. Inorganic sulfides are sulfides of the alkali metals and alkaline-earth metals, such as lithium sulfide, potassium sulfide, calcium sulfide and, preferably, sodium sulfide. The corresponding hydrosulfides or hydrogen sulfide can also be used, optionally in conjunction with alkali metal hydroxides.

Suitable organic sulfides are salt-like sulfides with organic cations. Organic sulfides which can be used for the present invention are also those organic sulfur compounds which release sulfide or hydrosulfide anions under the reaction conditions, such as thioacetamide, carbon disulfide or thio-N-methylpyrrolidone. The sulfides can also contain water of crystallization.

Dihaloaromatic compounds and sulfide are generally also referred to as monomers.

Suitable solvents for the preparation of the polymer are dipolar aprotic solvents of the amide type such as dimethylformamide (DMF), dimethylacetamide (DMAc), N-methylcaprolactam or N-alkylated pyrrolidones such as N-methylpyrrolidone (NMP) or mixtures thereof. NMP is particularly preferred.

To prepare the sulfur-containing polymer by the process according to the invention, the aromatic dihalo compound is reacted in step a) with the sulfide in a solvent to about 40 to 98% (based on the aromatic dihalo compound). At this point in time, the reaction mixture a) contains the low molecular weight polymer, substantially undissolved salt (e.g., sodium chloride), unconverted monomers and the solvent. The precipitated salt formed during the reaction is removed from the reaction mixture in step b), for example by hot filtration. Filtration is advantageously carried out at a temperature at which the sulfur-containing polymer is in the liquid or dissolved state in the reaction mixture. The reaction mixture, substantially freed from the precipitated salt, is then further polymerized in step c), if necessary under pressure. The polymer is finally isolated from the reaction mixture by known methods.

The reaction conditions for step a) can be varied within wide limits. For example, the reaction temperatures can be 180° C. to 280° C., preferably 220 to 260° C. The reaction times can be 10 minutes to 20 hours, preferably 30 minutes to 3 hours. Temperature programs can also be used advantageously, for example 30 minutes at 225° C. and then 1 hour at 245° C.

The average molar mass, expressed as the weight-average Mw, is in the range from 1000 to 30,000 g/mol, preferably 2000 to 20,000 g/mol and in particular 3000 to 15,000 g/mol after step a).

At the end of step a), the salt is substantially in the form of a crystalline precipitate in the reaction mixture and is removed by suitable methods.

The salt is removed from the reaction mixture when the reaction conversion, based on the aromatic dihalo compound, is from 40 to 98%, preferably 50 to 96% and in particular 60 to 94%.

The salt can be removed by simple pressure filtration at a temperature at which the polymer is in the liquid or dissolved state in the reaction mixture. These temperatures are usually 100 to 300° C. Instead of pressure filtration, other methods for removing solids from liquids can, however, also be used, for example centrifugation or decantation.

It is usual that the reaction under step a) releases chemically bound water of hydration. For the filtration in step b) it can be advantageous to remove some or all of the water of reaction. If desired, the contents of the reactor can, before being worked up, be rendered neutral or slightly acidic by the addition of acids. Suitable acids are, for example, acetic acid, hydrochloric acid or carbon dioxide.

The filtration residue is advantageously washed with solvent in order to remove adhering mother liquor residues. The resulting dilute polymer solution can be concentrated and combined with the filtrate. The wet filter cake is dried in order to recover adhering solvent residues. This separation gives salt as a solid and the polymer dissolved in the filtrate.

The filtrate is then further polymerized in step c). It is also possible, prior to step c), to increase the concentration of the polymers by concentrating the filtered reaction mixture by evaporating the solvent and other volatile components. It has proven advantageous to concentrate the mixture until the polymer content is from 20 to 70% by weight, preferably 30 to 60% by weight.

Furthermore, between steps b) and c), up to 20 mol %, preferably 0.5 to 5 mol %, based on the amount of substance used in step a), of one of the two monomers can be added in order to ensure as exact a stoichiometric equivalence as possible between sulfide and aromatic dihalo compound. Finally, by introducing steam, volatile components can be removed from the mixture in order to remove undesired constituents.

The reaction conditions for the further polymerization in step c) can be varied within wide limits. For example, the reaction temperatures can be 180° C. to 290° C., preferably 230 to 270° C. The reaction times can be 10 minutes to 10 hours, preferably 20 minutes to 2 hours. To continue the polymerization in step c), additional measures may be taken which, according to the prior art, lead to the attainment of very high molar masses. These include, for example, the addition of promoters. Such promoters are, for example, alkali metal and alkaline-earth metal salts of low molecular weight carboxylic acids, in particular sodium acetate. It is also possible to add defined quantities of water in step c) in order, according to the prior art, to conduct the further polymerization in a two-phase reaction system. Finally, other additives, for example acids such as acetic acid or hydrogen sulfide or carbon dioxide, can be added in order to adjust the basic strength of the system.

The molecular weights $M_w$ after step c) are above those of step a) and are 5000 to 200,000, preferably 10,000 to 150,000 and in particular 20,000 to 100,000 g/mol.

All phases of the polymer preparation can be carried out either batchwise or continuously. For example, the reaction can be carried out continuously using a battery of stirred-tank reactors, in a flow tube or a combination of the two.

To isolate the polymer, there are various methods available. The polymer is removed by simple pressure filtration. Other methods for removing solids from liquids can, however, also be used, for example centrifugation or decantation. It is also possible to work up the resultant suspension by flash evaporation or spray drying. Solvents and other low molecular weight substances are removed as main constituents in the form of vapors, and the polymer precipitates as a substantially dry solid.

The process according to the invention is described below using the preparation of polyphenylene sulfide (PPS) as an example, but is not limited to this.

Sodium sulfide trihydrate is dissolved in NMP at 180° C. in a titanium autoclave. Some of the water of hydration is then distilled off until an internal temperature of 195° C. is reached. The contents of the autoclave are further heated and p-dichlorobenzene (DCB) is added at a temperature of from 215 to 220° C. The mixture is then polymerized at 230° C. for 30 minutes to 1 hour. The resultant reaction mixture is filtered at 230° C. through a filter into a second reaction vessel where it is heated at 250° C. for a further 90 minutes. The reactor is then cooled to 140° C. and the reaction product is filtered. The filter cake comprising PPS is boiled in water, washed several times with water and dried.

The melting points of the polyphenylene sulfides are 270° C. to 305° C., and are typically 280 to 295° C. The melt viscosity is in the range from 5 to 1000 Pas, preferably 20 to 500 Pas. The melt viscosity is stable without additives: at 300° C., it changes by less than 10% over the course of an hour.

The sulfur-containing polymers prepared by the process according to the invention, such as polyarylene sulfides, in particular polyphenylene sulfide, are notable for high purity and high quality. The property that the polymers are practically odorless and colorless is particularly noteworthy. The polymers also have a favorable response to thermal stress.

The invention also provides a salt-free sulfur-containing polymer, for example a polyarylene sulfide, preferably polyphenylene sulfide, prepared by the process according to the invention.

The sulfur-containing polymers prepared according to the invention can be processed by melt extrusion to give molded articles. Alternatively, films and fibers with good mechanical properties can also be prepared.

EXAMPLES 1) 284 g of sodium sulfide trihydrate (approximately 60%; 2.2 mol) were dissolved in 780 g of NMP in a 2 liter titanium autoclave with stirring at 180° C. Approximately 130 ml of condensate were then distilled off at atmospheric pressure. The contents of the sealed autoclave were heated to 230° C. and, from 215° C., 418 g of p-DCB (1.3×2.2 mol), dissolved while warm in 220 g of NMP, were added at a rate of 20 ml/minute. The mixture was then polymerized at 235° C. for 90 minutes and the pressure in the autoclave was then released to approximately 2.5 bar in order to substantially remove the water of reaction. The temperature was maintained above 225° C. The contents of the reactor were then filtered at 230° C. and approximately 5 bar through a PTFE filter cloth having a nominal pore size of 12 $\mu$m into a second autoclave, from which excess DCB was substantially removed by introducing steam. After adding 4 g of sodium sulfide (60%), the formulation was polymerized at 230° C. for 90 minutes, diluted with approximately 300 ml of NMP and cooled. The crystalline reaction mass was filtered off, and the residue was boiled up several times in water, filtered off and dried.

Yield of PPS polymer: 205 g. The average molar mass of the polymer is Mw=28,000 g/mol.

2) The polymer from Example 1 (pure white) and commercially available polyphenylene sulfide having a melting viscosity of 500 poise, measured at 310° C. and a shear rate of 1000 sec$^{-1}$, were stored in the air at 250° C. over 3 days. The cooled samples of the polymer from Example 1 display hardly any discoloration, while Fortron 205 changed from white to dark brown. (®Fortron 205, manufacturer: Fortron Industries, Wilmington N.C., USA).

Example 3

This example shows that the sodium chloride residue from Example 1 contains sodium sulfide:

20 g of the sodium chloride residue obtained from Example 1 were dissolved in 200 ml of water, and the solution was poured into a gas-washing bottle and acidified with 10 ml of 20% hydrochloric acid. Nitrogen was then passed through the gas-washing bottle, and the nitrogen stream was washed in a second gas-washing bottle with 100 ml of 4% sodium hydroxide solution. After one hour, ammoniacal silver nitrate solution was added to the contents of the second gas-washing bottle and the resultant deep black silver sulfide precipitate was filtered off and washed thoroughly with water. The dried silver sulfide weighed 1.3 g. This corresponds to a sodium sulfide content in the thus analyzed sodium chloride residue of 2% by weight.

Example 4

This example shows that the sulfide content contained in the sodium chloride markedly reduces the molecular weight of PPS under reaction conditions:

The sodium chloride residue obtained by hot filtration from Example 1 was washed several times with hot (230° C.) NMP under pressure in order to remove the last mother liquor residues. 270 g of the thus purified, NMP-damp sodium chloride (approximately 25% by weight NMP), together with 200 g of PPS (Fortron 205), 1 liter of NMP and 10 g of water were heated at 235° C. with stirring for 1 hour in a 2 liter titanium autoclave. The cooled contents of the reactor were filtered and the filtration residue was boiled twice in 2.5 liters of water, filtered and washed. The resultant PPS was then dried at 130° C. in a vacuum drying cabinet for 24 hours. The melting viscosity of the polymer was 35 Pas at 31° C. and 1000 sec$^{-1}$ compared with 60 Pas for Fortron 205.

What is claimed is:

1. A process for the preparation of sulfur-containing polymers from at least one aromatic dihalo compound and one sulfide in a solvent, which comprises
   a) partially reacting the aromatic dihalo compound and the sulfide,
   b) removing the salt formed, which is undissolved in the reaction medium, and
   c) further polymerizing the reaction mixture, substantially freed from the salt.

2. The process as claimed in claim 1, wherein the polymerized mixture is removed when the conversion, based on aromatic dihalo compound in step a), has reached a value in the range from 40 to 98%.

3. The process as claimed in claim 1, wherein the average molar mass, expressed as the weight-average $M_w$, after step a) is in the range from 1000 to 30,000 g/mol.

4. The process as claimed in claim 1, wherein the salt is removed at a temperature at which the polymer is in the liquid or dissolved state in the reaction mixture.

5. The process as claimed in claim 1, wherein the reaction mixture is concentrated by distillation after step b).

6. The process as claimed in claim 1, wherein up to 20 mol % of sulfide or aromatic dihalo compound, based on the amount of substance used in step a), are added after step b) and before step c).

7. The process as claimed in claim 1, wherein the reaction mixture is subjected to a steam distillation before step c).

8. The process as claimed in claim 1, wherein the average molecular weight $M_w$ after step c) is in the range from 5000 to 200,000 g/mol.

9. The process as claimed in claim 1, wherein the sulfur-containing polymer is a polyarylene sulfide.

10. A salt-free sulfur-containing polymer prepared by the process according to claim 1.

11. A polymer as claimed in claim 10, which is a polyarylene sulfide.

12. Sulfur-containing polymers prepared by the process according to claim 1 having a form selected from the group consisting of molded articles, films and fibers.

* * * * *

UNITED STATES PATENT AND TRADEMARK OFFICE
CERTIFICATE OF CORRECTION

PATENT NO.   : 6,201,098 B1  
DATED        : March 13, 2001  
INVENTOR(S)  : Michael Haubs, Stephan Wagner and Olaf Besser Page 1 of 1

It is certified that error appears in the above-identified patent and that said Letters Patent is hereby corrected as shown below:

<u>Column 6,</u>  
Line 4, "31 °C" should read -- 310 °C --.

Signed and Sealed this

Fifteenth Day of January, 2002

Attest:

JAMES E. ROGAN  
*Attesting Officer*     *Director of the United States Patent and Trademark Office*